April 14, 1970  YOSSIMI KATO ET AL  3,505,874
PRESSURE GAUGE INCORPORATING SEMI-CONDUCTOR TRANSDUCER
Filed Dec. 23, 1968
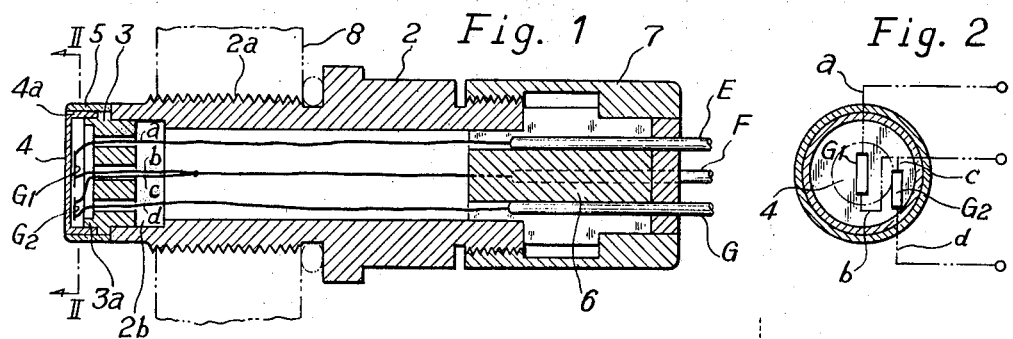
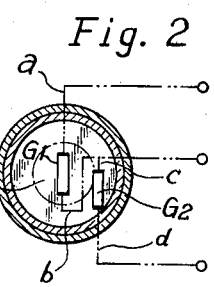
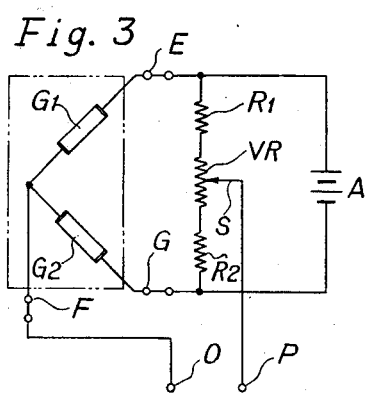
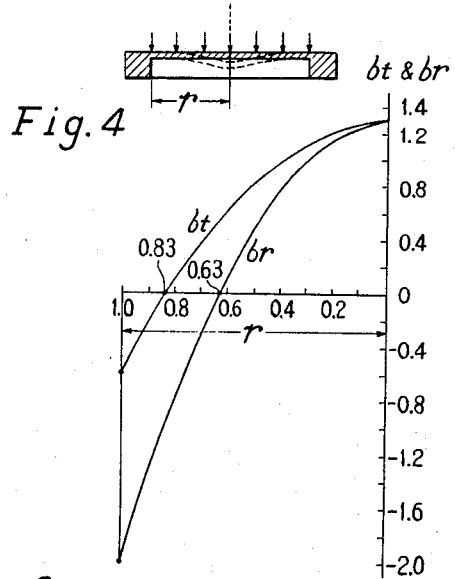
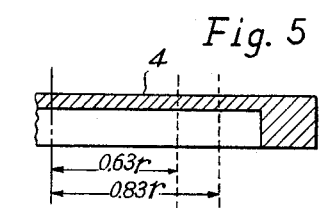
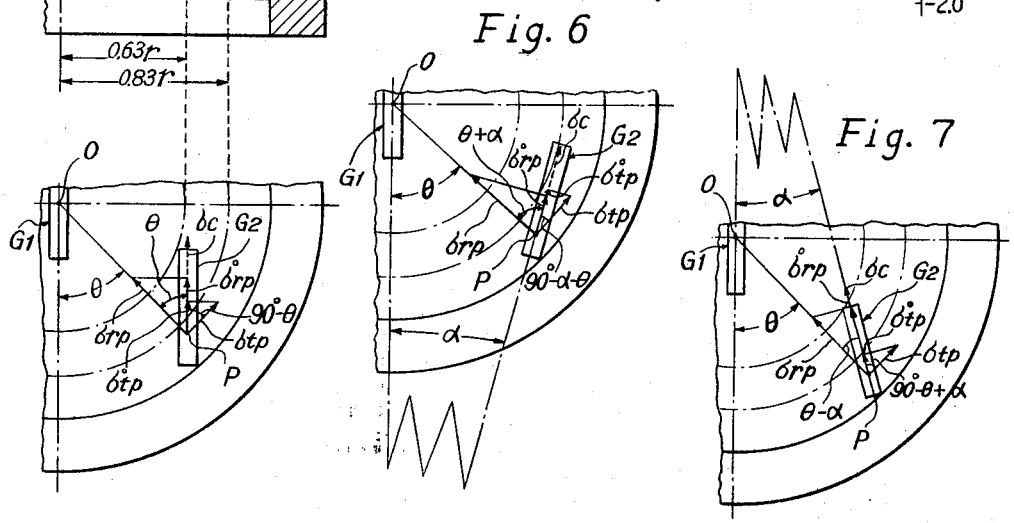
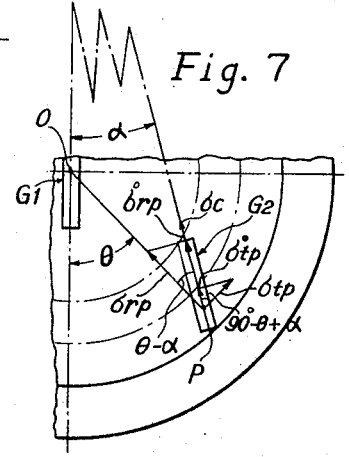

United States Patent Office 3,505,874
Patented Apr. 14, 1970

3,505,874
PRESSURE GAUGE INCORPORATING
SEMI-CONDUCTOR TRANSDUCER
Yossimi Kato and Yasunori Muramatsu, Kariya, Aichi, Japan, assignors to Toyoda Machine Works Ltd., Kariya, Aichi, Japan
Filed Dec. 23, 1968, Ser. No. 785,988
Claims priority, application Japan, Dec. 27, 1967, 43/83,882
Int. Cl. G01l 9/04
U.S. Cl. 73—398                                    1 Claim

ABSTRACT OF THE DISCLOSURE

A pressure gauge incorporating semi-conductor transducers includes a deformable disk diaphragm. Two transducer elements comprising two layers of monocrystal semi-conductor material having the same characteristics are bonded on one surface of the diaphragm. One of the transducer elements is bonded in a diametrical direction on a central portion of the diaphragm and the other of said transducer elements is bonded on an outer peripheral portion of the diaphragm in such manner that an angle between a normal passing over a point of said element and going toward the center of said diaphragm and the crystal direction of maximum sensitivity of the element is between 20° and 80°.

---

The present invention relates to an improved pressure gauge to measure pressure by means of semi-conductor transducer elements fixed on a deformable diaphragm.

It is well known to measure pressure by means of semi-conductor transducer elements bonded on a deformable diaphragm, and various means of measurements therefor are also known.

In one of such known pressure gauges, on an inner surface of a deformable disk diaphragm held fixed by its outer periphery on a casing of a pressure gauge, there is bonded a semi-conductor transducer element in a diametrical direction on a central portion of the diaphragm, and there is also bonded another semi-conductor transducer element in a tangential direction on an outer peripheral portion of the diaphragm, and by a bridge circuit constructed by said two elements, pressure variations acting on an outer surface of said diaphragm are measured.

In general, when a disk diaphragm held fixed by its outer periphery is subjected to an uniform pressure load thereon, there are produced various different radial stresses and tangential stresses at a point having different radius on said diaphragm, as will be explained later. If "$r$" is taken as a radium of said diaphragm, said radial stress at a point having radius of about $0.63r$, and said tangential stress at a point having radius of about $0.83r$ become null respectively. This means that a point having radius of about $0.63r$, and a point having radius of about $0.83r$ on said disk diaphragm define a respective stress converting point, and on a central portion of the disk diaphragm within the border of a concentric circle of $0.63r$ radius, and on a central portion of the disk diaphragm within the border of a concentric circle of $0.83r$ radius, a positive stress (tensile stress) is produced respectively, and on an outer peripheral portion of the disk diaphragm out of said respective border, a negative stress (compressive stress) is produced respectively, and thereby a respective positive stress activating zone and a respective negative stress activating zone are formed.

Accordingly, in the above-mentioned pressure gauge, the transducer element bonded diametrically on the central portion is subjected to a positive radial stress, and the transducer element bonded tangentially on the outer peripheral portion is subjected to a negative tangential stress, whereby an output corresponding to a sum of the values of pressure variations measured in a bridge circuit constructed by said both elements is obtained. But in practice, not only a sufficient output can not be obtained by the fact that said tangential stress subjected by the element bonded on the peripheral portion is considerably less than said radial stress subjected by the element bonded on the central portion, but also a good linearity of output characteristics can not be obtained by the fact that the degrees of resistance variations of said both elements per unit pressure change do not coincide. Moreover, the portion, whereon said element to be subjected to the tangential stress is bonded, is very narrow as an outer peripheral portion out of said border circle of radius of $0.83r$, and thereby the manufacture of a compact sensitive device is prevented. Further, a binding material to bond said element is maldistributed in the narrow peripheral portion, whereby the diaphragm strain is ill affected, especially in a gauge for measuring micro pressures.

It has been proposed by the present application to replace the transducer element bonded tangentially on the outer peripheral portion of the disk diaphragm of the above-mentioned known pressure gauge by a transducer element bonded radially. In such a construction of pressure sensitive part, said replaced element bonded radially on the outer peripheral portion can detect the radial stress, whereby a large output is obtained as compared with that of the above-mentioned construction.

However, it is necessary to make the size of said replaced element small as compared with that of the element bonded on the central portion, otherwise said replaced element overruns the border circle of zero stress and detects the stress of different sign, whereby both outputs are cancelled by each other. But, by making small said replaced element, the bonding area becomes also small, whereby the accurate detection of diaphragm strain becomes difficult, which prevents also the manufacture of a compact sensitive device.

Moreover, if both elements are different in their sizes and forms, the indicated values of outputs become unstable due to the creep effect of a binding material.

Generally, in a pressure gauge of this type, the creep effect is increased in proportion as the length of a transducer element becomes short. In any case, the difference of sizes and forms of transducer elements bonded in a pressure gauge affects the performance of said pressure gauge.

The present invention relates to a new configuration of transducer elements bonded on a deformable diaphragm which overcomes the difficulties encountered in the prior art techniques as above mentioned, and aims to provide an improved pressure gauge of this kind, wherein a higher sensitivity and a larger output are obtained with a small-sized pressure sensitive device and also excellent self temperature compensation of the transducer elements bonded, together with and improved linearity of output in response to pressure to be measured are obtained.

According to its principal characteristics, a pressure gauge incorporating semi-conductor transducer by the present invention comprises a supporting means of a deformable disk diaphragm on a casing of a pressure gauge gripping firmly said diaphragm around its outer periphery, two transducer elements consisting of two layers of monocrystal of semi-conductor having the same characteristic isolatedly bonded on an inner surface of said diaphragm, one of said transducer elements being bonded in a diametrical direction on a central portion of said diaphragm in order to detect a radial stress $\sigma r$ only, the other of said transducer elements being bonded on an outer peripheral portion of said diaphragm in such manner that an angle between a normal passing over a point on said element and going towards the center of said diaphragm and the crystal direction of maximum sensitivity of said element is included between 20° and 80°, in order to detect a resultant stress vector of a radial stress $\sigma r$ and a tangential stress $\sigma t$ having an opposite sign to that of a stress detected by said element bonded on the central portion of the diaphragm.

In this configuration, a transducer element which is to be disposed in the outer peripheral portion of the diaphragm is bonded thereon with advantage spacially, because said element can be disposed aslant to the normal concerned. Accordingly, an element having the same size and the same characteristic as those of an element which is to be bonded on the central portion of the diaphragm can be utilized for said element to be bonded on the outer peripheral portion. Thus, it is possible to make equal the respective resistivities of two transducer elements to be bonded and to construct a balanced bridge circuit, whereby the stabilization of zero point, improved linearity of output characteristic, the interchangeability of bridge terminals and good temperature characteristics of transducer elements are assured. Moreover, since a specially advantageous configuration is obtained as above mentioned, it is possible to provide a small sized pressure sensitive device, and the volume change thereof produced by loosening or displacement of the diaphragm is almost negligible, whereby the pressure characteristic in the transition stage is improved and higher reliability for the device is obtained. Further, since the transducer element bonded on the outer periphery portion can detect a resultant vector of a tangential stress $\sigma t$ and a radial stress $\sigma r$, and a substantially equal stress effect to that of the element bonded on the central portion of the diaphragm can be obtained, by selecting pertinently the bonding position and the angle of inclination to the normal concerned of said element bonded on the periphery portion, a further improved linearity of output in response to pressure to be measured is obtained resulting in an increased output.

In the following, the present invention will be described in detail, in connection with the accompanying drawings, in which:

FIG. 1 shows a longitudinal sectional view of an example of the present invention;

FIG. 2 is a sectional view along the line II—II of FIG. 1;

FIG. 3 is a schematic view of an external circuit for recording the output of two strain transducer elements;

FIG. 4 represents schematically a state of stress distribution on a disk diaphragm held fixed by its outer periphery;

FIGS. 5, 6 and 7 are enlarged partial views showing various bonding positions of semi-conductor transducer elements.

As shown in FIG. 1, in an example of a pressure gauge by the invention, there is provided a hollow cylindrical casing 2, and at its one end a circular depression 2b is formed, within which a supporting member 3 is fixed, and on its outer surface, a circular projection 3a is coaxially formed in order to receive a deformable disk diaphragm 4 thereon by its outer peripheral flange 4a, and said diaphragm 4 is firmly gripped by means of a fixing ring 5 bonded thereon. Before said diaphragm 4 has been received on the supporting member 3, two semi-conductor transducer elements $G_1$ and $G_2$ having the same characteristic are bonded on thin insulating layers formed on an inner surface of said diaphragm 4.

One of said transducer elements $G_1$ is bonded in a diametrical direction on a central portion of the diaphragm 4, and the other of said transducer elements $G_2$ is bonded on an outer peripheral portion of the diaphragm 4 nearly parallel to the element $G_1$ (FIG. 2).

On both ends of the respective elements $G_1$ and $G_2$, there are connected lead wires $a$, $b$, $c$ and $d$, which are led out of the supporting member 3 through small holes and are connected with other wires E, F ad G in order to construct a half bridge circuit. The wire E is connected with one of the lead wires $a$ of the element $G_1$, the wire F is connected with another lead wire $b$ of the element $G_1$ and together with one of the lead wires $c$ of the element $G_2$, and the wire G is connected with another lead wire $d$ of the element $G_2$. These wires E, F and G are supported by an insulating member 6 fixed by a cap 7 on the other end of the casing 2, and are led outside therefrom. A screw part 2a in the vicinity of the front end of the casing 2 serves for fixing this gauge on a wall 8 of any vessel containing pressure atmosphere to be measured.

The wire E and the wire G are, as shown in FIG. 3, connected with both terminals of an electric source A respectively, and fixed resistances $R_1$, $R_2$ and a balancing variable resistance VR in series are shunt-connected between said both terminals, and the wire F and a slider S of the variable resistance VR are connected with output terminals O and P. Any suitable indicating instruments such as a voltmeter, an ammeter, etc. or any recording devices such as an oscilloscope, a recorder, etc. are connected with the output terminals O and P, and thereby the electrical output corresponding to any pressure variations measured by the transducer elements $G_1$ and $G_2$ are indicated or recorded.

In the following, a characteristic construction of the pressure sensitive device by the present invention comprising a new configuration of transducer elements bonded on a deformable diaphragm will be explained in detail.

As already described, two transducer elements $G_1$ and $G_2$ are bonded respectively on the central portion and the outer peripheral portion of the diaphragm nearly parallel each other. In this configuration, as shown in FIG. 5, the angle between a normal OP led towards the center O of the diaphragm from a point P on the element $G_2$ bonded on the peripheral portion and the crystal direction of maximum sensitivity of the element $G_2$ (the direction of longitudinal axis of $G_2$) is an acute angle. If this angle is represented by $\theta$, and the radial stress of the diaphragm on the point P is represented by $\sigma rp$, a radial stress $\sigma°rp$ detected on the point P by the element $G_2$ is $\sigma rp \cos \theta$. Similarly, if the tangential stress of the diaphragm on the point P is represented by $\sigma tp$, a tangential stress $\sigma°tp$ detected on the point P by the element $G_2$ is $\sigma tp \sin \theta$. Therefore, the element $G_2$ detects a resultant vector $\sigma c = \sigma°rp + \sigma°tp$. Even though, there are some differences between said angles $\theta$ corresponding to any points in the longitudinal direction of the element $G_2$, said angle $\theta$ is always included between about 20°~80°, whereby the element $G_2$ always detects the corresponding said resultant vector $\sigma c$. In this case, since the element $G_2$ is disposed across the positive stress activating zone and the negative stress activating zone, the vector $\sigma°tp$ produced by the tangential stress $\sigma tp$ becomes small by relative cancellation. But, by the fact that the vector $\sigma°rp$ produced by the radial stress $\sigma rp$ is large, the overall resultant vector $\sigma c$ becomes large. Moreover, as this resultant vector has the opposite sign to that of the stress detected by the element $G_1$ bonded on the central portion of the diaphragm, it is possible to obtain an output corresponding to the sum of the resistance variations of both elements $G_1$ and $G_2$. Accordingly, a much larger output than that of the element $G_2$ which detects the tangential stress $\sigma t$ only is obtained. Further, in this configuration, as the element $G_2$ is disposed aslant to the normal or the tangent concerned with pre-defined inclination, it is easy to dispose the element $G_2$ in the limited peripheral portion. Therefore, the element $G_2$ having the same dimension and form as those of the centrally disposed element $G_1$ can be utilized, whereby a pair of the elements having the equal resistivity can be disposed, in order to construct a balanced bridge circuit, as its adjacent two sides, and at the same time, the harmful creep effect is improved. Moreover, by giving a required inclination of angle α, as shown in FIGS. 6 and 7, to the element $G_2$ against the central element $G_1$, it is possible to equalize nearly the degrees of resistance variations of a pair of the elements $G_1$ and $G_2$, whereby a more improved linearity of output in response to pressure and a more accurate pressure measurement are obtained. Further, since two elements having nearly equal resistance-temperature characteristics can be selected for the elements $G_1$ and $G_2$ to be bonded on the same surface of the same diaphragm, perfect self temperature compensations are obtained.

It is to be understood that the present invention is not limited to the above-mentioned example and can comprise many variants without departing from the scope of the invention. Thus, it is possible to utilize the above-mentioned specific pressure sensitive device by the invention for various other types of the pressure measuring instruments as a unit device.

What we claim is:

1. A pressure gauge incorporating semi-conductor transducer comprising a supporting means of a deformable disk diaphragm on a casing of a pressure gauge gripping firmly said diaphragm around its outer periphery, two transducer elements consisting of two layers of monocrystal of semi-conductor having the same characteristic isolatedly bonded on an inner surface of said diaphragm, one of said transducer elements being bonded in a diametrical direction on a central portion of said diaphragm in order to detect a radial stress only, the other of said transducer elements being bonded on an outer peripheral portion of said diaphragm in such manner that an angle between a normal passing over a point on said element and going towards the center of said diaphragm and the crystal direction of maximum sensitivity of said element is included between 20° and 80°, in order to detect a resultant stress vector of a radial stress and a tangential stress having an opposite sign to that of a stress detected by said element bonded on the central portion of the diaphragm.

References Cited

UNITED STATES PATENTS 3,358,511   12/1967   Bargen _____ 73—398

DONALD O. WOODIEL, Primary Examiner

U.S. Cl. X.R.

338—4